Figure 1:
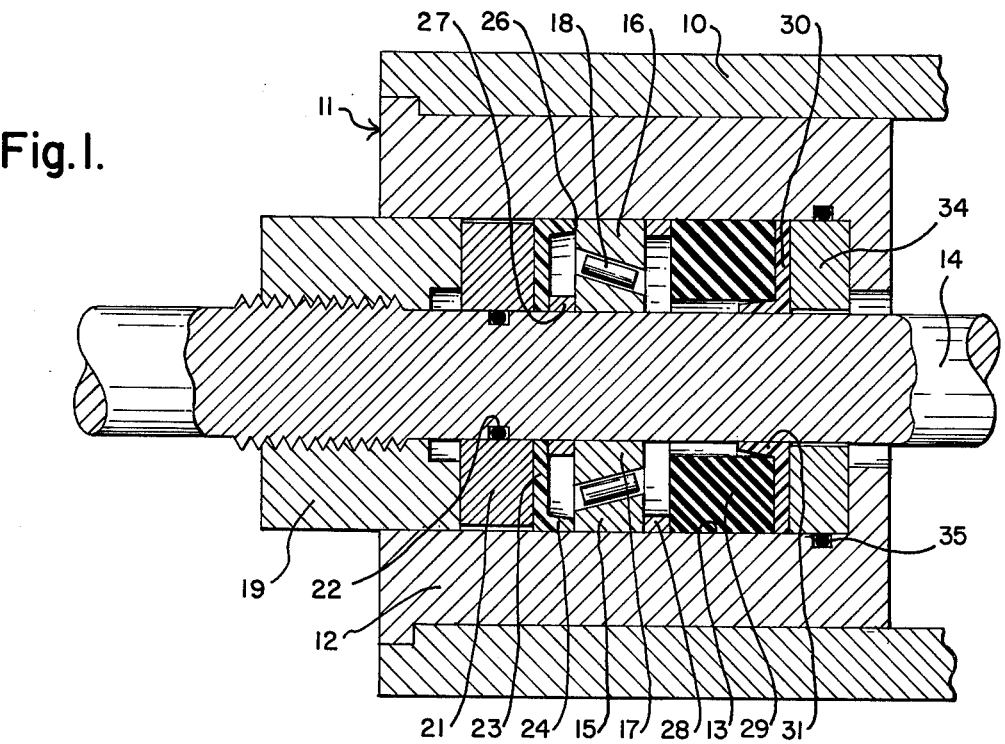

United States Patent [19]

Zimmer

[11] 4,097,095
[45] Jun. 27, 1978

[54] PERMANENTLY LUBRICATED BEARING CARTRIDGE

[76] Inventor: Aaron Zimmer, 6476 Monitor St., Pittsburgh, Pa. 15217

[21] Appl. No.: 796,143

[22] Filed: May 12, 1977

[51] Int. Cl.² .......................................... F16C 13/02
[52] U.S. Cl. ........................................ 308/20; 193/37; 308/187; 308/187.2; 308/214
[58] Field of Search ............... 308/20, 18, 106, 86, 308/109, 116, 363, 187, 78, 187.1, 187.2, 207, 214, 238, DIG. 7, DIG. 8; 184/43, 12, 61, 14, 7 R; 277/25, 39; 193/37

[56] References Cited

U.S. PATENT DOCUMENTS

| 3,680,933 | 8/1972 | Walker | 308/20 X |
| 3,811,743 | 5/1974 | Wren | 308/187 |
| 3,841,721 | 10/1974 | Coutant et al. | 193/37 X |

Primary Examiner—Trygve M. Blix
Assistant Examiner—Douglas C. Butler
Attorney, Agent, or Firm—Buell, Blenko & Ziesenheim

[57] ABSTRACT

The cartridge comprises an anti-friction bearing positioned between rotating seals. At one end of the bearing the outer race makes rotary sealing contact with rim of an annular sealing disk of softer material than the bearing race. At the other end of the bearing the outer race is urged axially against the sealing disk by a resilient member. The other end of that member presses against a second annular sealing disk having a flange around its central opening which forms a rotary seal with a shaft extended through the cartridge. The bearing cartridge during assembly is partially filled with lubricant and rotation of the bearing causes lubricant to be thrown against the inner surface of the bearing and the cartridge by centrifugal force and circulated thereby through the load-carrying area of the bearing in the direction of the pressure applied by the resilient member and back through the remainder of the bearing.

3 Claims, 5 Drawing Figures

U.S. Patent June 27, 1978 4,097,095

PERMANENTLY LUBRICATED BEARING CARTRIDGE

This invention relates to bearing cartridges for conveyor rolls and the like. It is more particularly concerned with anti-friction bearing cartridges with self-contained lubrication.

Bearings for conveyor rolls in coal mines and the like are frequently difficult to maintain and inconvenient to lubricate. The bearing must be sealed against dirt in the surrounding atmosphere, so that its condition cannot be observed. That construction thus renders lubrication difficult, and if during lubrication of the bearing in place dirt particles find their way into the bearing, it will be damaged because the bearing seals prevent their escape. Even where lubrication is carefully carried out, the lubricant in the bearing breaks down in time, and, as it cannot escape, bearing life is limited. It would clearly be desirable to equip such conveyor rolls with permanently lubricated bearing cartridges. The term "permanently" is not used here in its absolute sense, of course, but with the connotation of several years of service.

It is an object of my invention to provide an anti-friction bearing cartridge with self-contained lubrication which requires no service for a period of several years. It is another object to provide such a cartridge in which the lubricant circulates through the bearing elements. It is yet another object to provide such a cartridge in which the circulation of the lubricant through the bearing elements is positively induced. It is still another object to provide such a cartridge in which the self-contained lubricant is sealed in place. Other objects of my invention will appear in the course of the description thereof which follows.

I have found that in conventional sealed bearings the lubricant, even when kept dirt-free, tends to break down relatively rapidly because only a relatively small portion of it actually carries the load. This is true whether the lubricant is oil, grease or a ferro-fluid magnetically held in place. The portion of the lubricant concentrated at the heat-generating surface of the bearing breaks down and then remains in place while the remainder of the lubricant never reaches the loaded area. In my bearing cartridge to be described hereinafter, centrifugal force causes the lubricant to travel toward the inner surface of the cartridge housing and I direct that lubricant through the bearing along the inside surface of its outer member at least over the load-bearing portion of the circle of rotation and back through the bearing through other portions of that circle. In this way, each element of the aggregate volume of the lubricant is subjected to load during a portion of the time of operation and is relieved from load during another portion, so that the life of the lubricant is greatly extended.

An embodiment of my invention presently preferred by me is illustrated in the attached Figures, to which reference is now made.

Figure 2:
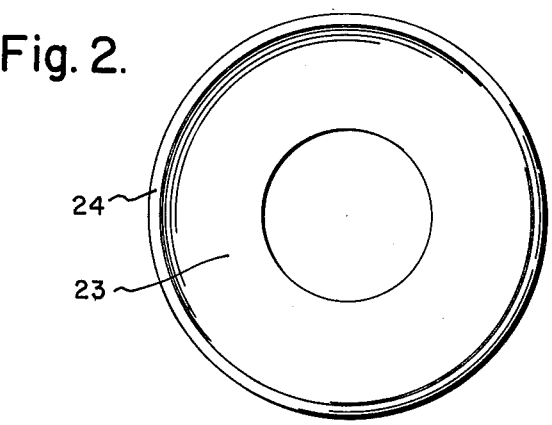
Figure 3:
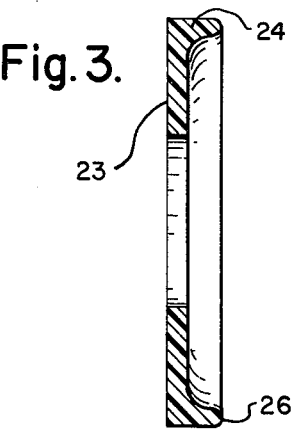
Figure 4:
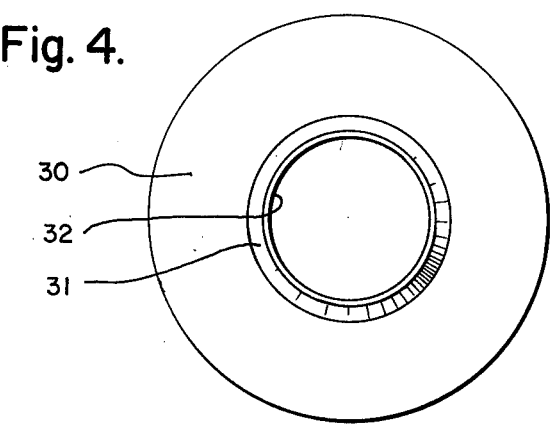
Figure 5:
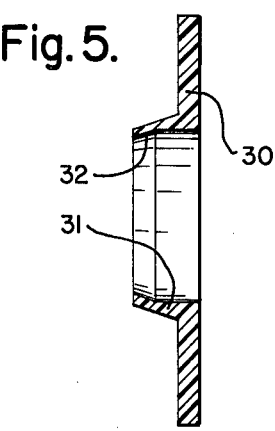

FIG. 1 is a longitudinal cross section of a bearing cartridge employing a tapered roller bearing element, FIGS. 2 and 3 are plan and cross sections of a sealing element illustrated in FIG. 1, and FIGS. 4 and 5 are plane and cross sections of a second sealing element illustrated in FIG. 1.

My invention will be described hereinafter as applied to bearings for conveyor rolls, in which the conveyor roll rotates around a fixed shaft.

In FIG. 1 a conveyor roll shell 10 is fitted at one end with a bearing cartridge 11 comprising a cylindrical housing 12 dimensioned to fit inside shell 10. Housing 12 has a central cylindrical cavity with an inside wall 13 of diameter greater than the diameter of roll shaft 14 which is centrally positioned in the cavity by a tapered roller bearing 15. That bearing comprises an outer race 16 which fits against wall 13 of housing 12 and an inner race 17 which fits against shaft 14. Between bearing races 16 and 17 are positioned bearing rollers 18 which roll thereon. Rollers 18 are confined in a cage or retainer which is omitted from the Figure for the sake of clarity. Bearing race 17 is stationery, as is shaft 14, and bearing race 16 rotates along with bearing housing 12. The outer end of housing 12 is closed by sleeve 19 which is fastened on shaft 14.

Inside housing 12 is a rotary seal 21 affixed to shaft 14 and statically sealed thereagainst by an O-ring 22 in a groove in the shaft. Seal 21, which may be of any suitable type, abuts the inner end of sleeve 19 and forms a rotary seal around its exterior with housing 12. Abutting rotary seal 21 is a seal disk 23 of a material which is softer than bearing race 16. Disk 23 may be made of a metal or a non-metal as the application may require. For conveyor rolls, I prefer to use the plastic Deldrin. Seal disk 23 is formed with a flange 24 around its outer edge projecting away from seal 21. This element is shown in detail in FIGS. 2 and 3. The edge 26 of flange 24 abuts an end face of outer race 16 of bearing 15 and forms a rotary seal therewith. Inner race 17 of bearing 15 is spaced from disk 23 by spacer 27. On the other side of bearing 15 is positioned a resilient member 29 which exerts pressure on bearing race 16 through spacer 28. Abutting member 29 is a second seal member comprising an annular disk of suitable material 30, as in the case of disk 23, having around the circumference of its hole a flange 31 extending under element 29. The surface 32 of flange 31 projects inwardly in its free state so that when shaft 14 is passed therethrough, surface 32 seals firmly thereagainst. This sealing element is shown in more detail in FIGS. 4 and 5.

Between disk 30 and the inside end of housing 12 is positioned a second rotary seal 34 statically sealed to housing 12 by O-ring 35 in a groove in that housing. The inner circumference of seal 34 forms a rotary seal with shaft 14. Like seal 21, seal 34 may be of any suitable type. The function of seals 21 and 34 is to keep foreign material out of the bearing cartridge 11 and to keep lubricant in the bearing cartridge.

The end 26 of flange 24 of seal disk 23 is initially formed with a radius as is shown in FIG. 3. In service, since seal disk 23 is softer than race 16, the friction between flange end 26 and the end face of bearing race 16 causes end 26 to wear flat over a portion of its width and form an effective seal with race 16.

In its assembly, cartridge 11 is provided with a lubricant in quantity sufficient to fill to a predetermined level the space between bearing races 16 and 17 and the spaces between bearing 15 and seal 23 on one side and between bearing 15 and resilient member 29, backed up by seal disk 30, on the other side. It will be evident that the latter two spaces above mentioned constitute lubricant resevoirs, one on each side of bearing 15. When cartridge 11 rotates about shaft 14, the lubricant in those reservoirs is initially thrown outwardly against the inner circumferences of flange 24, spacer 28 and bearing race 16 by centrifugal force. As the inner face of race 16 is tapered, the lubricant will tend to travel from the bearing end adjacent spacer 28 to the end adjacent flange 24. Flange 24 of non-rotating seal disk 23 forms a seal with rotating race 16, so that the lubricant emerging from bearing 15 on that side along race 16 is forced to travel back toward shaft 14 and again through bearing 15 along the outer surface of inner race 17. The lubricant thus circulates continuously through the bearing from the reservoir on one side to the reservoir on the other side and there is no localized lubricant breakdown. Resilient member 29 rotates with cartridge housing 12. Seal disk 30 rotates about shaft 14. The principal purpose of seal 30 is to prevent leakage of lubricant out of the bearing when a conveyor roll containing cartridge 11 is kept in storage, or is operated in a position other than horizontal.

In addition to the pattern of circulation described above, there is another mode or group of modes which exist independently of any taper in the bearing elements. When my bearing cartridge is loaded from above, as is the case with conveyor rolls, the clearance between stationary and rotating members is less at the top of the bearing cross section shown in FIG. 1 than at the bottom. The load at any instant is carried by the balls or rollers in an anti-friction bearing which are at the top of the circle of rotation. The lubricant thrown outwardly by centrifugal force tends to be squeezed out of the bearing at the top of its cross section and to flow back again through the larger gap at the bottom, and around the circumference everywhere except in the region of the load-carrying elements. In the absence of any taper or thrust the lubricant would be as likely to move in one direction axially as the other, but my resilient member 29 exerts thrust toward the end of the conveyor roll, which, in a ball-bearing, for example, reduces the gap and increases the pressure between ball and outer race at the inside end of the bearing and reduces the gap between ball and inner race at the outside end of the bearing. The system is thus unbalanced, and the lubricant moves from higher pressure to lower pressure region toward the roll end at the top of the circle of rotation, and is directed by seal disk 23 back again in the other direction around the remaining circumference of the bearing. It is evident that this circulation is positively induced.

In the foregoing specification I have set out certain presently preferred embodiments of my invention; however, it will be understood that my invention can be otherwise embodied within the scope of the following claims.

I claim:

1. A lubricated anti-friction bearing cartridge adapted to fit within a conveyor roll shell comprising a housing, a bearing including coaxial inner and outer bearing races spaced apart to provide a bearing cavity between their bearing surfaces, anti-friction elements disposed between those races, sealing means at each end of those races spaced from them so as to provide a lubricant reservoir at each end of the races and to prevent leakage of fluid out of those reservoirs, and means exerting axial pressure on one race, whereby when the lubricant reservoirs are filled to less than their maximum capacity and the bearing is rotated under load the lubricant fluid is thrown outward by centrifugal force and circulates between reservoirs across the inner surface of at least a portion of the outer race in one direction and in the opposite direction through other portions of the bearing.

2. Apparatus of claim 1 in which at least one sealing means comprise an annular disk with a circumferential rim, the end of which rim abuts the outer bearing race, the disk being of a softer material than the outer bearing race so that it wears into a rotating sealing surface thereagainst.

3. Apparatus of claim 1 including a shaft through the inner bearing race and in which at least one sealing element comprises an annular disk with a rim surrounding its central hole, that rim being made of softer material than the shaft and having at least the portion of its inside surface adjacent its outer end tapering inwardly toward that end so as to be expanded by a shaft passed therethrough and effect a rotating seal therewith.

* * * * *